United States Patent [19]

Rogers et al.

[11] Patent Number: 5,462,618

[45] Date of Patent: Oct. 31, 1995

[54] CONTINUOUS PROCESS OF MAKING UNIDIRECTIONAL GRAPHITE FIBER REINFORCED PULTRUDED RODS HAVING MINIMAL FIBER WAVINESS

[75] Inventors: Charles W. Rogers, Arlington; David A. Crane, Fort Worth; Habib G. Rai, Bedford, all of Tex.

[73] Assignee: Bell Helicopter Textron Inc., Fort Worth, Tex.

[21] Appl. No.: 252,927

[22] Filed: Jun. 2, 1994

Related U.S. Application Data

[62] Division of Ser. No. 35,910, Mar. 23, 1993, Pat. No. 5,324,563.

[51] Int. Cl.$^6$ .......................... B65H 81/00; B32B 31/00; B29C 67/00; B29C 71/00

[52] U.S. Cl. .................... 156/161; 156/160; 264/29.2; 264/108; 264/231; 264/234; 264/137; 264/171.25

[58] Field of Search .................... 156/160, 161, 156/242, 244.12, 244.23; 264/29.2, 540, 177.2, 231, 234, 108

[56] References Cited

U.S. PATENT DOCUMENTS

| | | | |
|---|---|---|---|
| 3,391,050 | 7/1968 | Nebesar | 161/143 |
| 3,627,466 | 12/1971 | Steingiser et al. | 23/209.1 |
| 3,627,571 | 12/1971 | Cass | 117/118 |
| 3,674,531 | 7/1972 | Kalnin et al. | 156/S4 |
| 3,839,072 | 10/1974 | Kearsey | 117/46 |
| 3,841,079 | 10/1974 | Ram et al. | 57/140 |
| 3,881,977 | 5/1975 | Dauksys | 156/242 |
| 4,065,593 | 12/1977 | Peterson | 428/92 |
| 4,131,644 | 12/1978 | Nagasaka et al. | 423/447.5 |
| 4,348,347 | 9/1982 | Brown | 264/231 |
| 4,400,421 | 8/1983 | Stover | 428/113 |
| 4,540,737 | 9/1985 | Wissbrun et al. | 524/599 |
| 4,661,336 | 4/1987 | McCabe | 423/447.2 |
| 4,680,224 | 7/1987 | O'Connor | 428/294 |
| 4,792,481 | 12/1988 | O'Connor et al. | 428/288 |
| 4,812,343 | 3/1989 | Kiekhaefer et al. | 428/35.6 |

FOREIGN PATENT DOCUMENTS

| | | |
|---|---|---|
| 0393536 | 10/1990 | European Pat. Off. . |
| 1592578 | 7/1981 | United Kingdom . |

OTHER PUBLICATIONS

A. Mrse and M. R. Piggott, "Relation Between Fibre Divagation and Compressive Properties of fibre Composites" Apr. 2–5, 1990.

J. M. Prandy and H. T. Hahn, "Compressive Strength of Carbon Fibers," Apr. 2–5, 1990.

Jill M. Prandy, H. Thomas Hahn and Linda E. Jones, "The Compressive Behavior of Carbon Fibers," Jul. 1989.

*Primary Examiner*—James D. Withers
*Attorney, Agent, or Firm*—Robert A. Felsman; Mark D. Perdue

[57] ABSTRACT

A method of forming a pultruded shaped composite material comprising carbon fiber having a diameter not greater than 0.001 inch aligned linearly with a degree of waviness defined by an average amplitude to length (A/L) ratio of less than 0.9 percent in a matrix is formed around the fiber and solidified or cured into a rigid form that will not melt during subsequent processing steps to prevent an increase in waviness during subsequent processing steps. The compressive strength of the composite material approaches the tensile strength of the material. The matrix material consists essentially of a resin present in the range of about 10 to 50 percent by volume of the composite material. The A/L ratio is determined by measuring the distribution of angularity found in the aligned carbon fibers in a selective cross section cut at five degrees to the fiber plane, wherein the standard deviation for a 300 sample angularity measurement is not greater than 0.88 degrees.

4 Claims, 8 Drawing Sheets

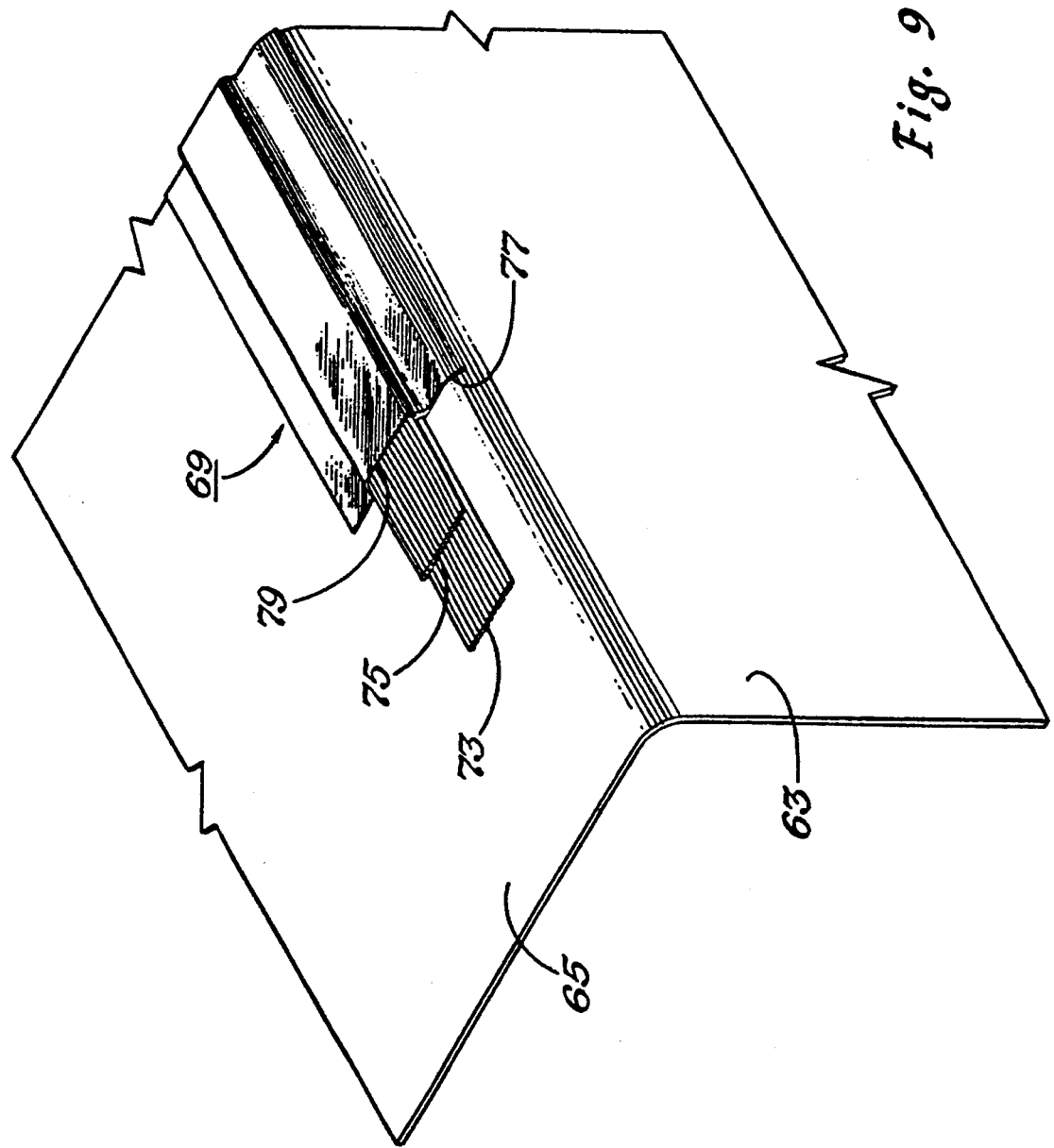

CONTINUOUS PROCESS OF MAKING UNIDIRECTIONAL GRAPHITE FIBER REINFORCED PULTRUDED RODS HAVING MINIMAL FIBER WAVINESS

This application is a division of application Ser. No. 08/035,910, filed Mar. 23, 1993, now U.S. Pat. No. 5,324,563.

BACKGROUND OF THE INVENTION

1. Field Of The Invention

This invention relates to the area of technology known generally as "composite materials", and in particular to methods and apparatus for producing composite materials and structures of increased strength.

2. Background Information

Composite materials consisting of fibers and a matrix of resin are used to produce a wide range of useful products, from fiberglass sail boats to the recent radar transparent, stealth aircraft. Structures of composite materials have numerous advantages that include the promise of higher strength and lower weight than those of other materials such as metal. The promise has not been fulfilled, however, because some composites materials, principally those using graphite fibers, have compressive strengths that are only a fraction of the tensile strength. Theoretically, composite materials of graphite fiber should have a compressive strength that equals the tensile strength. In practice the compressive strength is much less for reasons that have not been fully understood.

It has been demonstrated that composite materials that include curved graphite fibers have a reduced fatigue resistance. It has been suggested that waviness of graphite fibers in a composite material can reduce compressive strength.

Meanwhile, the commercially available composite materials that include graphite continue to be made with fibers that by reason of waviness, or some other reason, have decreased compressive strength. As a result, the promise of reducing weight by the use of composite materials has not been realized, with a consequent increase in cost and a decrease in performance in structures such as aircraft.

SUMMARY OF THE INVENTION

The technical basis for this invention is the recognition that the fibers in a cured laminate must be straight or much straighter then they are now in order for the laminate to possess the axial properties predicted by theory. Practical knowledge of the multiple steps of prepreg fabrication, lay-up, compaction and cure reveal many opportunities to degrade fiber alignment. Fiber diameter is becoming increasingly finer along with major improvements in fiber strength and stiffness. It is so fine that it has almost no ability of it's own to maintain straightness. Our invention is to provide a material form where the best fiber straightness that can be achieved is locked in and secured against further degradation in later processing.

Our invention is to make a rod of fibers and fully cured resin which is of sufficient diameter that it possess inherent stiffness adequate to ensure that it will not kink during lay-up or cure. The diameter should be small enough that the rod can follow contour and be processed similar to a large diameter fiber. It should be large enough to allow individual handling.

The advantage of using rods of straight or nearly straight fibers becomes obvious when the loss in stiffness and compression strength due to fiber waviness is understood. The rods are formed into a layer of rods for lay-up with cross plied tape or fabric to form a wing or fuselage structure. The rods become the longerons or stringers carrying axial load while the cross plied skins carry shear.

A rod of graphite fiber and cured matrix where the fibers are straight or nearly straight, will possess an increased stiffness and compression strength over that demonstrated by the current material forms; tape, fabric and roving. For the high strength, intermediate modulus fiber of which IM6 is representative, it can be demonstrated analytically that the composite rod stiffness will be increased by 15% and that this stiffness will be retained both in tension and compression. The current material forms exhibit a nonlinear stress-strain behavior; stiffening in tension and softening in compression. This is due to the inherent waviness of the fiber in the cured laminate. When the fibers are maintained straight through-out the laminate processing in accordance with the requirements of this disclosure, then the softening in compression will be negligible.

In addition to the increased stiffness, compression strengths in excess of 310,000 psi can be demonstrated analytically while current material forms typically yield 250,000 psi. or less.

From a theoretical standpoint, the degree of waviness which yields the reduced stiffness is slight and can be expressed as a percentage in terms of amplitude divided by wave length ratio (A/L). Current material forms are shown to possess a waviness of greater than 1.2%. In order to achieve the increased stiffness and strength proposed, the A/L ratio must be less than 0.9%. From a practical standpoint, this degree of waviness will be defined for this invention by measuring the distribution of angularity found in fiber alignment at a given cross section.

It is our contention that the fiber is straighter as it emerges from the graphitizing oven than after spooling and subsequent handling. Therefore, we propose that one method of making the rod is to convert the fiber bundle or group of tows into a cured rod in a continuous manner through a pultrusion process as it emerges. There are many variations of impregnation and cure that could conceivably make the rod at this point.

A range of 10–50 percent by volume, preferably 20 percent, of the composite material should be resin, the remaining 50 to 90% being fiber. The graphite fibers have a cross-sectional diameter of not greater than about 0.001 inch. The pultruded rods are aligned in a matrix in a structure to produce a layer of rods to carry loads that include compressive loads.

The above as well as additional objects, features, and advantages of the invention will become apparent in the following detailed description.

BRIEF DESCRIPTION OF THE DRAWINGS

FIG. 9 is an additional enlargement of a portion of the lower fuselage shown in FIG. 6, with portions of the composite material broken away to show the structural use for the composite material of the invention.

DETAILED DESCRIPTION OF THE THEORETICAL BACKGROUND FOR THE INVENTION

THEORETICAL APPROACH

Geometric Consideration

Figure 1:
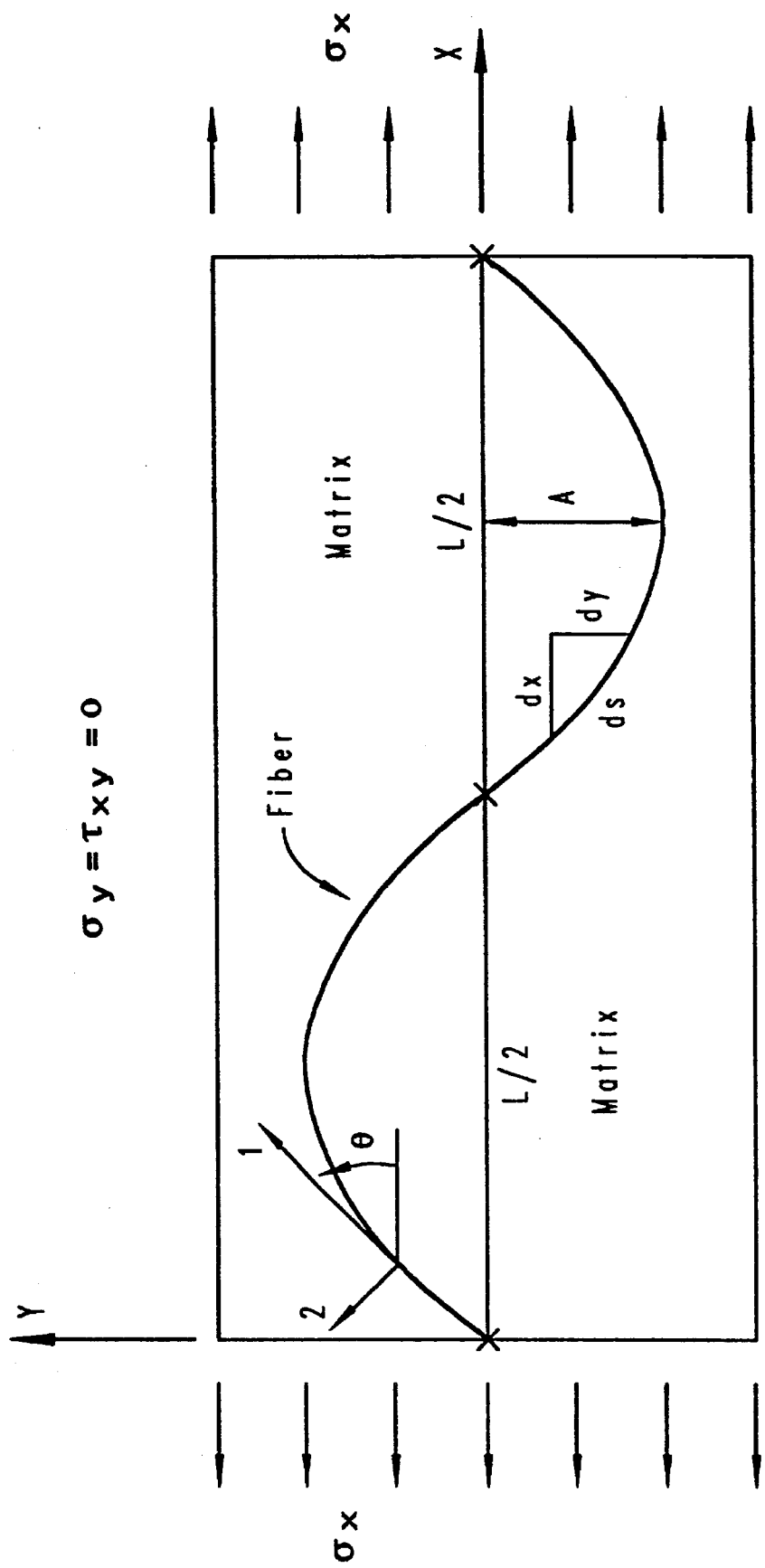
FIG. 1 describes the geometry of fiber waviness in terms of amplitude (A) and wave length (L).

Consider a lamina of unidirectional composite, whose fibers are initially deformed as shown in FIG. 1. Assume the functional representation of the fiber shape in Euclidtan plane $R^2$, (x-y plane) is characterized by a sinusoidal wave function as follows:

$$y(x) = A \sin(2\pi x/L) \tag{1}$$

Where A is the amplitude and L is the full wave length of the sine shape. Here, the scalar quantity A/L is defined as fiber wariness. The derivative of y(x) is given by the following expression:

$$dy/dx = 2\pi A/L \cos(2\pi x/L) \tag{2}$$

Here $\tan\theta = dy/dx$ where $\theta$ is the local fiber orientation angle as shown in FIG. 1. $\theta$ can be written in following form:

$$\theta(x, A/L) = \tan^{-1}[2\pi A/L \cos(2\pi x/L)] \tag{3}$$

Now, consider a differential arc length ds as shown in FIG. 1

$$ds^2 = dx^2 + dy^2 \tag{4}$$

Equation (4) can be written as:

$$ds = [1 + (dy/dx)^2]^{1/2} dx \tag{5}$$

Substituting (2) into (5) and letting $\alpha = 2\pi x/L$. Equation (5) can then be written as:

$$s = L/2\pi \int_0^{2\pi} [1 + (2\pi A/L)^2 (1 - \sin^2\alpha)]^{1/2} d\alpha \tag{6}$$

Now let $\mu = (2\pi A/L)^2$ and $\eta^2 = \mu/(1+\mu)$ equation (6) takes it's final form as:

$$s = (L(1+\mu)^{1/2}/2\pi) \int_0^{2\pi} (1 - \eta^2 \sin\alpha)^{1/2} d\alpha \tag{7}$$

Equation (7) has the form of an elliptical integral of the second kind with modulus $0 < \eta < 1$. The elliptical integral of Equation (7) can be represented as:

$$s(\eta) = F(-\tfrac{1}{2}, \tfrac{1}{2}, 1, \eta^2) 2\pi L (1+\mu)^{1/2} \tag{8}$$

Where $F(-\tfrac{1}{2}, \tfrac{1}{2}, 1, \eta^2)$ is a hypergeometric series representing a particular solution of the hypergeometric differential equations encountered in the theory of spherical harmonics. Here $$F(\psi, \phi, \lambda, X) = \sum_{k=0}^{\infty} (\psi)_k (\phi)_k X^k / (\lambda)_k k!$$

Where the $(\zeta)_k$ has the following interpretation:

$(\zeta)_o = 1$ $(\zeta)_k = \zeta(\zeta+1) \ldots (\zeta+k-1)$ $k = 1, 2, \ldots,$ Here, $\zeta$ represents the variables $\psi, \phi, \lambda, X$. Now, expanding the above series in Equation (8) and performing some mathematical manipulations, Equation (7) can be written as:

$$s/L = (1-\eta^2)^{-1/2}[1 - \eta^2/4 - 3\eta^4/64 - 5\eta^6/256 - \ldots] \tag{9}$$

Recognizing from the binomial theorem that:

$$(1-\eta^2)^{-1/2} = 1 + \eta^2/2 + 3\eta^2/8 + \ldots (1 \cdot 3 \cdot 5 \ldots (2m-1)\eta^2)/(2 \cdot 4 \cdot 6 \ldots 2m) \tag{10}$$

By substituting (10) into (9), Equation (9) is reduced to high order polynomial:

$$s/L = 1 + \eta^2/4 + 13\eta^4/64 + 90\eta^6/512 + \ldots, \tag{11}$$

Equation (11) represents a fundamental relationship that relates s/L to $\eta^2$ or A/L. Roots of (11) can be obtained by using the Newton-Raphson iterative method for the approximate solution of nonlinear polynomial.

STIFFNESS MODEL

Lamina Elastic Moduli

Consider a lamina whose fibers are represented by equation (1). Assume, the lamina is subjected to a pure unidirectional state of stress $(\sigma_x)$ in the x-direction $(\sigma_y = \sigma_{xy} = 0)$ as shown in FIG. 1 The inplane state of strain at a point in structural system (x-y) is:

$$\begin{bmatrix} \epsilon_x \\ \epsilon_y \\ \gamma_{xy} \end{bmatrix} = \begin{bmatrix} \bar{S}_{11} & \bar{S}_{12} & \bar{S}_{16} \\ \bar{S}_{21} & \bar{S}_{22} & \bar{S}_{26} \\ \bar{S}_{16} & \bar{S}_{26} & \bar{S}_{66} \end{bmatrix} \begin{bmatrix} \sigma_x \\ \sigma_y \\ \tau_{xy} \end{bmatrix}$$

Where:

$\bar{S}_{11} = \cos^4\theta S_{11} + \sin^2\theta \cos^2\theta (2S_{12} + S_{66}) + \sin^4\theta S_{22}$ $\bar{S}_{22} = \sin^4\theta S_{11} + \sin^2\theta \cos^2\theta (2S_{12} + S_{66}) + \cos^4\theta S_{22}$ $\bar{S}_{12} = \sin^2\theta \cos^2\theta (S_{11} + S_{22} - S_{66}) + S_{12}(\cos^4\theta + \sin^4\theta) \tag{13}$ $\bar{S}_{16} = 2\cos^3\theta \sin\theta (S_{11} - S_{12}) + 2\cos\theta \sin^3\theta (S_{12} - S_{22}) - \cos\theta \sin\theta (\cos^2\theta - \sin^2\theta) S_{66}$ $\bar{S}_{26} = 2\cos\theta \sin^3\theta (S_{11} - S_{12}) + 2\cos^3\theta \sin\theta (S_{12} - S_{22}) - \cos\theta \sin\theta (\cos^2\theta - \sin^2\theta) S_{66}$ $\bar{S}_{66} = 4\cos^2\theta \sin^2\theta (S_{11} - S_{12}) + 4\cos^2\theta \sin^2\theta (S_{12} - S_{22}) - (\cos^2\theta - \sin^2\theta)^2 S_{66}$ Where the compliance constants in terms of engineering material properties are:

$S_{11}=1/E_1$, $S_{22}=1/E_2$, $S_{12}=-v_{12}/E_2$, $S_{66}=1/G_{12}$

By applying the stress boundary conditions Equations (12) become:

$$\epsilon_x = \overline{S}_{11}\sigma_x$$
$$\epsilon_y = \overline{S}_{12}\sigma_x \quad (14)$$
$$\gamma_{xy} = \overline{S}_{16}\sigma_x$$

Now, the gross strain over the wave length in the x-direction is:

$$\overline{\epsilon}_x = (1/L)\int_0^L \overline{S}_{11}\sigma_x dx \quad (15)$$

And the extensional moduli (Young' moduli) is:

$$E_x = L / \int_0^L \overline{S}_{11} dx \quad (16)$$

Note in Equation (13) that $\overline{S}_{11}$ is function of $\theta(x)$ which is given by Equation (3). Thus, Equation (16) represents an explicit relationship between elastic modulus and fiber waviness A/L. Solution of equation (16) is obtained by performing numerical integration based in Gauss-Legendre approximation.

INCREMENTAL LOADING SCHEME

Figure 2:
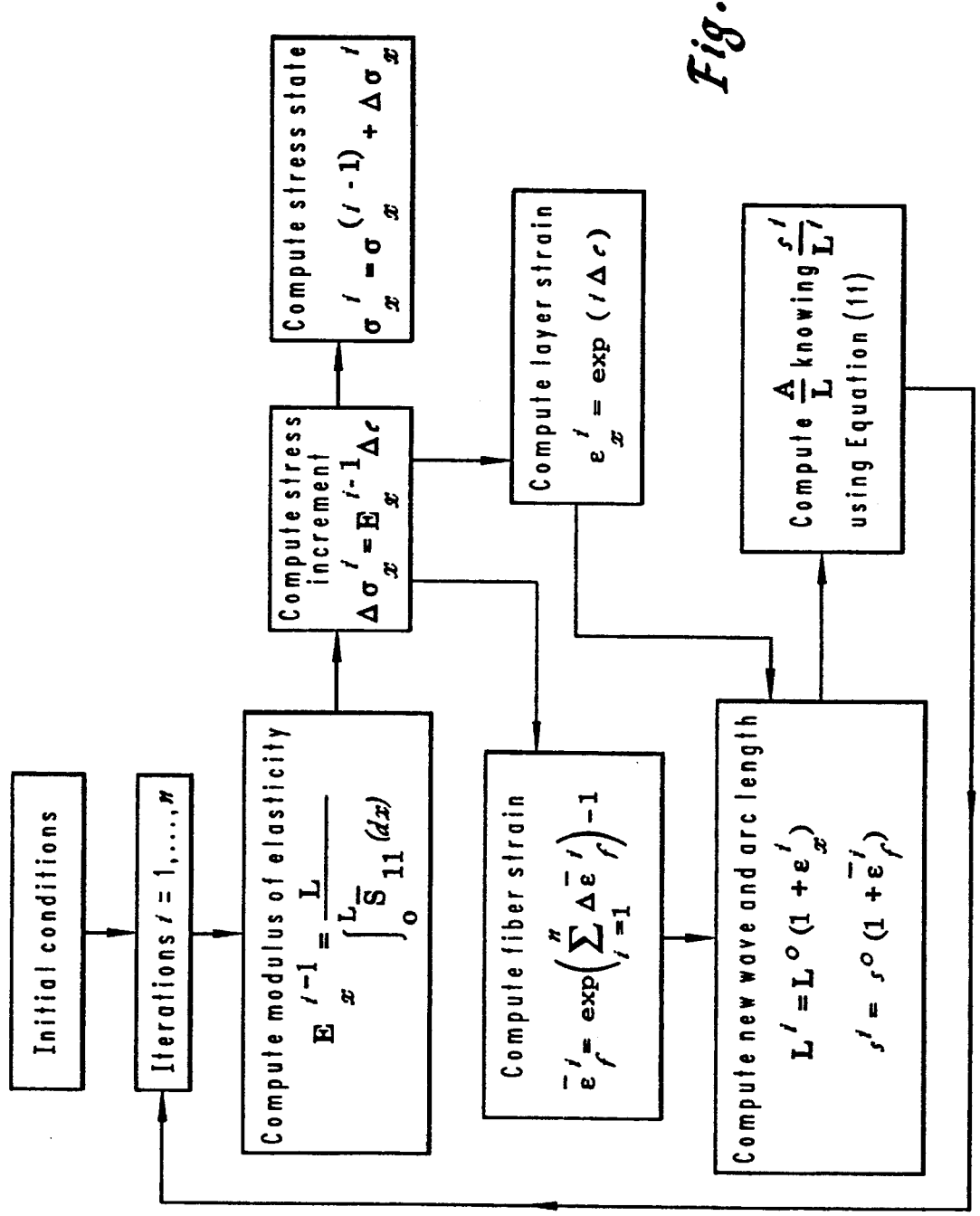
FIG. 2 describes the iterative solution procedure for stress-strain calculations.

The analysis scheme consists of applying a strain increment on a lamina such that a small change of fiber waviness is induced. Material properties are computed due to the change of fiber waviness. The incremental stress corresponding to the incremental strain is calculated and the state of stress is updated. Successive iterations enable generation of a complete stress-strain curve for the laminate in tension and in compression. FIG. 2 illustrates the steps employed in this scheme.

1. Imposing the following initial conditions:
Amplitude $A^o$
Wave length $L^o$
Arc length $S^o$
initial tensile stress $\sigma_x^o$ Due to the initial fiber waviness $A^o/L^o$, the elastic moduli $E_x$ is computed by virtue of (16).

2. Lamina Stress and Strain

Applying small increment of tensile strain $\Delta e$, the incremental stress $\Delta\sigma_x$ due to the incremental strain $\Delta e$ is computed by using Hooke's law:

$$\Delta\sigma_x^{(i)} = E_x \Delta e \quad (17)$$

The current stress at point in the lamina is computed as result of stress obtained from the previous computation added to the computed stress increment.

$$\sigma_x^{(i)} = \Delta\sigma_x^{(i)} + \sigma_x^{(i-1)} \quad (18)$$

3. Lamina strain

The current lamina strain is computed as:

$$\epsilon_x^{(i)} = \exp(i\Delta e) - 1 \quad (19)$$

4. Fiber strain

The increment fiber strain is obtained by performing a non-tensorial transformation of the state of strain (14) along fiber direction:

$$\Delta\epsilon_f^{(i)} = [\cos^2\theta\, \overline{S}_{11} + \sin^2\theta\, \overline{S}_{22} + \sin\theta\cos\theta\, \overline{S}_{12}]\Delta\sigma_x(i) \quad (20)$$

Substituting (13) into (20) one can obtain:

$$\Delta\epsilon_f^{(i)} = [\cos^2\theta\, S_{11} + \sin^2\theta\, S_{12}]\Delta\sigma_x^{(i)} \quad (21)$$

Now, the fiber average incremental strain along its direction is:

$$\Delta\overline{\epsilon}_f^{(i)} = 1/s \int_0^S \Delta\epsilon_f^{(i)} ds \quad (22)$$

and the fiber total strain is:

$$\overline{\epsilon}_f^{(i)} = \exp(\Sigma\Delta\overline{\epsilon}_f^{(i)}) - 1 \quad (23)$$

5. New Wave length and Arc Length

New wave length as well as new arc length can be deduced respectively as follows:

$$L^{(i)} = [\epsilon_x^{(i)} + 1]L^o \quad (24)$$

and $$S^{(i)} = [\overline{\epsilon}_f^{(i)} + 1]S^o \quad (25)$$

Therefore, a new s/L ratio can be deduced and a new A/L is recomputed by using equation (11). Successive iterations enable generation of a complete stress-strain curve for the laminate. Note that upon the application of negative strain increments ($-\Delta e$), the compression part of stress strain curve can also be obtained. For example, when the properties of IM6/HST7 are inserted in these equations and an A/L of 1.5% is assumed, the measured nonlinear stress-strain response of the system is duplicated by this theory. When an A/L of zero is assumed, linear stress-strain response is predicted.

Pertinent Published Data:

The sensitivity of laminate compression strength to small degrees of fiber waviness has been. alluded to in the literature but the nonlinear stress-strain response and the low compression strength were attributed to the anisotropy of the fiber according to Professor T. Hahn and J. M. Prandy as reported in "COMPRESSIVE STRENGTH OF CARBON FIBERS" given at the 35th International SAMPE Symposium, Apr. 2, 1990. The theoretical work provided in this disclosure clearly show that this behavior could be the sole result of fiber waviness. Contained in the above reference by Hahn are compression strain to failure results far exceeding any thing previously reported in the literature. Subsequent examination (by the inventors) of the load-deflection curve for this data (obtained from the full thesis documentation) revealed linear behavior to rupture completely invalidating the possibility that the nonlinearity is inherent in the fiber morphology. Further investigation revealed a specimen preparation procedure which accidentally straightened the fibers by letting short lengths hang out prior to impregnation and cure. The significance of this result was not recognized by the original investigators in the study.

The authors of this disclosure initiated the theoretical work in an effort to define the strength and stiffness loss of severe fiber waviness as a result of movement during the compaction portion of cure in a thick laminate. Since it was clear that laminate lay-up, compaction and cure could not be accomplished without introducing some unknown an un-inspectible degree of fiber waviness, some technique had to be developed to guarantee fiber alignment through the entire prepreg and part manufacturing process.

A rod of graphite fiber and cured matrix where the fibers are straight or nearly straight, will possess an increased stiffness and compression strength over that demonstrated by the current material forms; tape, fabric and roving conventional pultruded forms. Fiber waviness in the cured rod must exhibit an A/L ratio of less than 0.9 percent. This degree of waviness will be defined for this invention by measuring the distribution of angularity found in fiber alignment at a given cross section.

A range of between 10–50 percent by volume, preferably 20 percent, of the composite material shall be resin. The advantage of the rod over other material forms is greater as the strength and stiffness of the fiber increase. Fiber improvements are continuing on a steep learning curve with a concurrent trend of smaller diameter fibers. The smaller diameter fibers are inherently more difficult to keep straight during processing with existing material forms.

The rod assures that the best degree of fiber straightness that can be achieved by a supplier in a high volume controlled process is available to the fabricator. The rod also assures maintenance of this fiber straightness through out the many different types of laminating processes used to make structure.

DESCRIPTION OF THE PREFERRED EMBODIMENT

Figure 3:
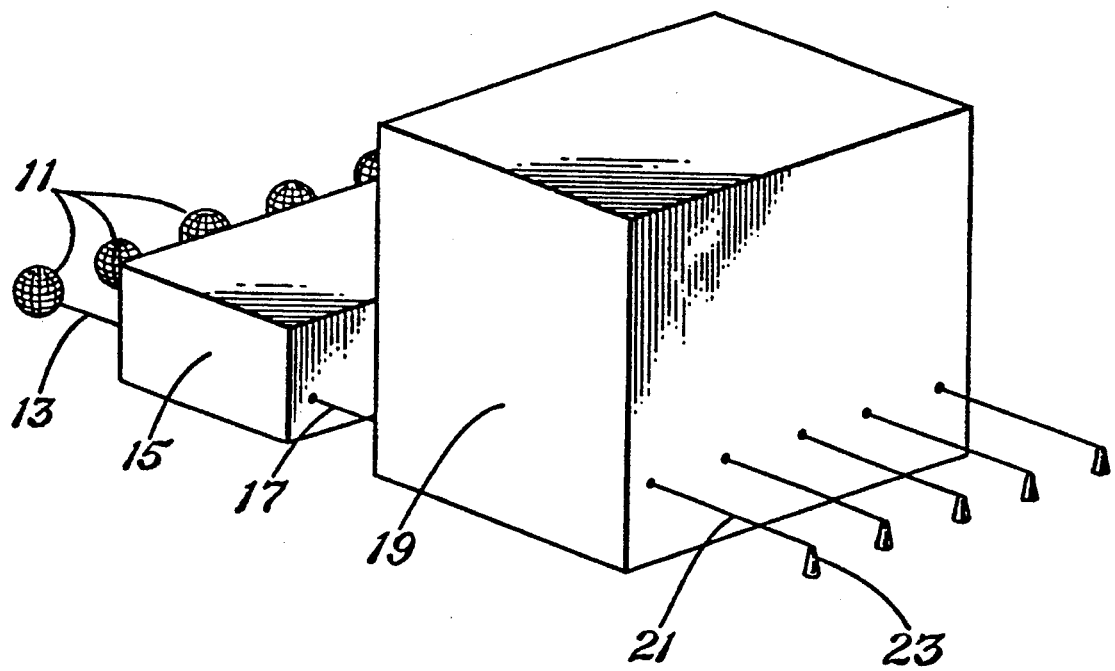
FIG. 3 is a schematic illustration of the prior art method of manufacturing graphite fibers for use in a composite material.

With reference now to the figures and in particular with reference to FIG. 3, the numeral 11, designates a ball of wound fibrous material such as Poly acrylonitrile from which la strand 13 is pulled through a furnace 15 to convert the strand or tow of fiber, into carbon. The resulting carbon fiber 17 is pulled through a large second oven 19, where it is heated to a higher temperature that converts some of the carbon 17 into graphite yielding a stiff, high strength fiber 21. Graphite fiber is then wound on a spool 23, which is eventually removed and used for storage preceding additional manufacturing methods used to manufacture a composite material of graphite fiber and a resin matrix. This manufacturing method is disclosed in the following patents:

A. Shindo et al, Japanese Patent 4405, 1962 and,

W. Watt et al, British Patent 1,148,874

Figure 4:
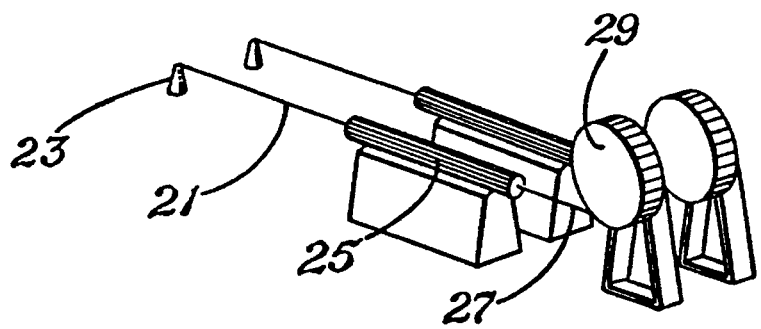
FIG. 4 is a schematic illustration of a prior art method of manufacturing pultruded rods of composite material, including those containing graphite fibers.

An additional manufacturing method which utilizes the graphite fibers 21 produced by the method illustrated in FIG. 3 is illustrated schematically in FIG. 4. Here, the graphite fiber 21 is pulled from the spool 23 shown in FIG. 3 into a pultrusion die 25, where multiple strands are exposed to an injection of resin which when cured in the die forms a stiff rod 27 that is wound on a large diameter spool or reel 29. This method of manufacturing pultruded rods is disclosed in the paper by Goldworthy entitled "Pultruded Composites— A Blueprint For Market Penetration: Part A"40th Annual Conference RP/CI Jan. 28, 1985.

Waviness is measured by cutting the laminate at a shallow angle with respect to the fibers and measuring the major and minor axes of the elliptical cross section of the individual fibers. Variations in these dimension from that of a fiber cut at the specified cutting angle yields a measure of local fiber misalignment which by it's distribution is a measure of waviness. Measurement of fiber waviness ranges can be performed by the following method. Machine and polish a representative sample (using standard techniques of the composites industry) at 5 degrees to the fiber plane so the elliptical cross sections of carbon fibers are clearly visible at a magnification of 400×. Take photomicrographs of five random areas of the sample to prevent measurement biasing. Measure and record the major and minor diametral axes of each elliptical cross-section. The inclination angle of each fiber is computed by:

$$\text{angle} = \arcsin(b/a) \tag{26}$$

where a=ellipse major diameter b=ellipse minor diameter

Compute the fiber inclination angle for each completely photographed fiber cross section. A minimum of 300 fiber angle determinations is required.

Compute the standard deviation of the entire fiber angle data set. Hereafter, straight fiber rods in this document are rods with a computed standard deviation of 0.88 degrees or less.

Figure 5:
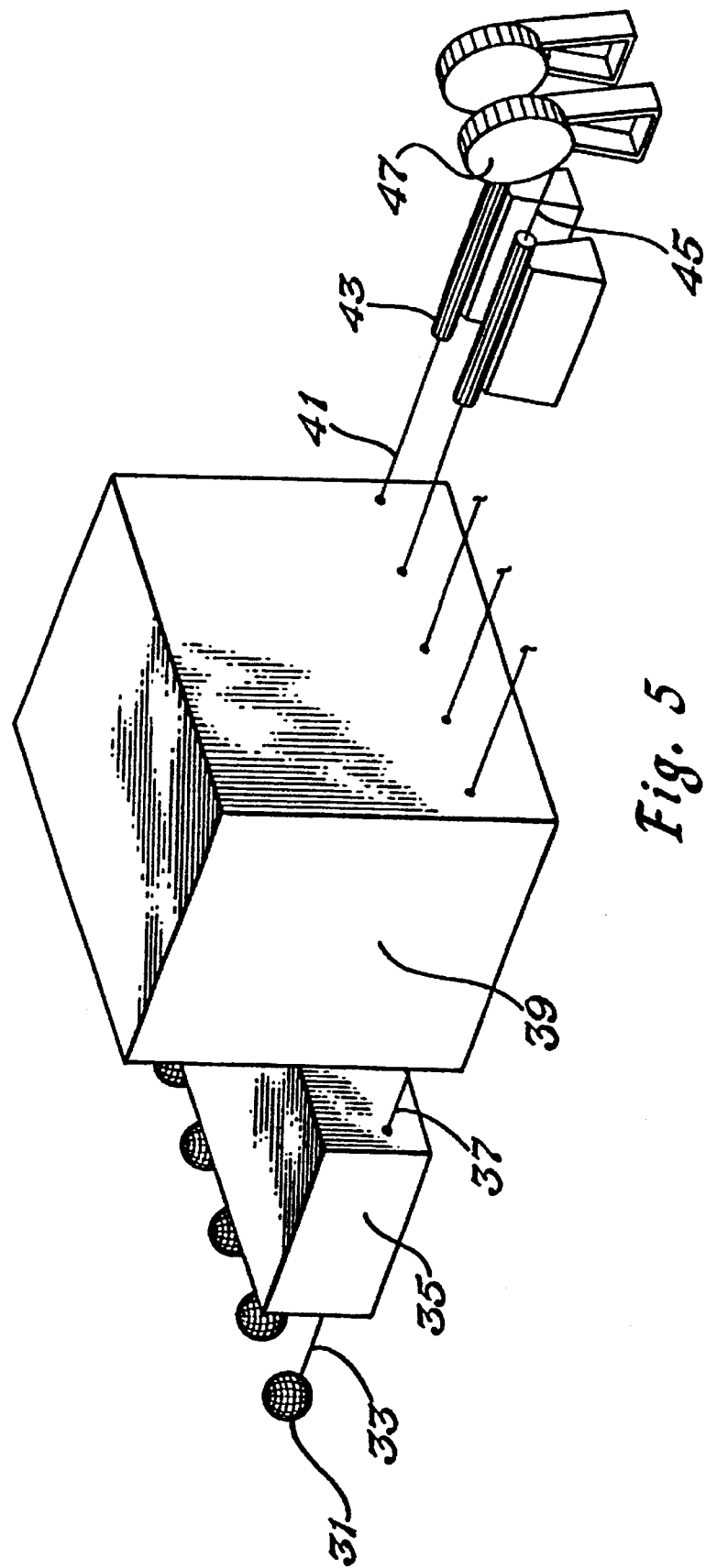
FIG. 5 is a schematic illustration of the invention herein.

We observed that the use of the prior art manufacturing methods disclosed in FIGS. 3 and 4 result in composite materials containing fiber waviness which yields reduced stiffness and compressive strength. The waviness in the composite laminate is the direct result of different lengths of fiber in a single tow as evidenced by a catenary, or drape of some fiber relative to others in a tow under tension. The method to minimize or eliminate the waviness in the graphite fibers is illustrated in FIG. 5 in which a multiple ball of PAN, which is also called a precursor 31, provides strands 33 pulled through a first furnace or oven 35 that converts the PAN into carbon fiber 37. This fiber is continuously pulled through a larger or second oven or furnaces 39 to produce graphite fibers 41, which while straight and contiguous, are continuously pulled through a pultrusion die 43. Only two pultrusion dies 43 are shown in FIG. 5 to simplify the drawing. Three graphite fibers 41 are shown as broken, but they too extend into additional dies not shown. Here, resin is injected onto the fibers and cured to produce a pultruded rod 45 that is wound upon a large diameter reel 47. The method illustrated schematically in FIG. 5 is therefore a combination of the prior art methods illustrated in FIGS. 3 and 4. A significant difference is the elimination of the prior art intermediate spool 23 of relative small diameter that receives carbon fiber prior to it's introduction into the pultrusion die 25 shown in FIG. 4. The pultruder pulling device must provide at least a part of the stretching requirement of the fiber process. Also, the tow must be sized to minimize the differential length which results as the tow is drawn around rollers which are inside the furnace or oven.

"Rule of mixtures" is the term given to a summing of composite constituent properties in a laminae in proportion to their volumetric percentages. When applied to epoxy composites containing large diameter, greater than 0.004 inch, fibers such as Boron or silicon carbide or steel, stiffness is predicted within engineering accuracy, plus or minus 3 percent, and stiffness is essentially constant with respect to stress. When applied to the emerging intermediate and high modules graphite fibers, measured stiffness is less than that predicted. In addition measured stiffness increases with increasing tension stress and decreases with increasing compressive stress. These graphite fibers are very small in diameter, less than 0.001 inch in diameter, and are easily misaligned during resin impregnation and subsequent laminate lay-up. It can be shown by analysis that this introduced fiber misalignment (waviness) causes a non-linear stress-strain response and reduction in stiffness.

The pultruded rods produced by the method illustrated schematically in FIG. 5 are in the range from about 0.010 to 0.25, preferably about 0.050 to 0.070 inch in cross sectional diameter and contain a multiplicity of straight graphite fibers that have been aligned linearly to minimize waviness. The matrix material formed around the fibers and cured in the pultrusion die 43 of FIG. 5 maintains the linear fiber alignment and retains it through subsequent manufacturing processing. The resin constitutes at least 10 percent by volume of a composite rod as a minimum but can range from 10–50 percent, preferably 20 percent. The resin may be any polymer, thermoplastic or thermoset, which does not melt or soften at subsequent processing or operating temperatures, such as the Shell 9310-9360 epoxy resin available from Shell Oil Corporation. The cross sectional diameter of the graphite fiber is less than 0.001 inch usually in the range of 0.0001 to 0.0003 inch.

Figure 6:
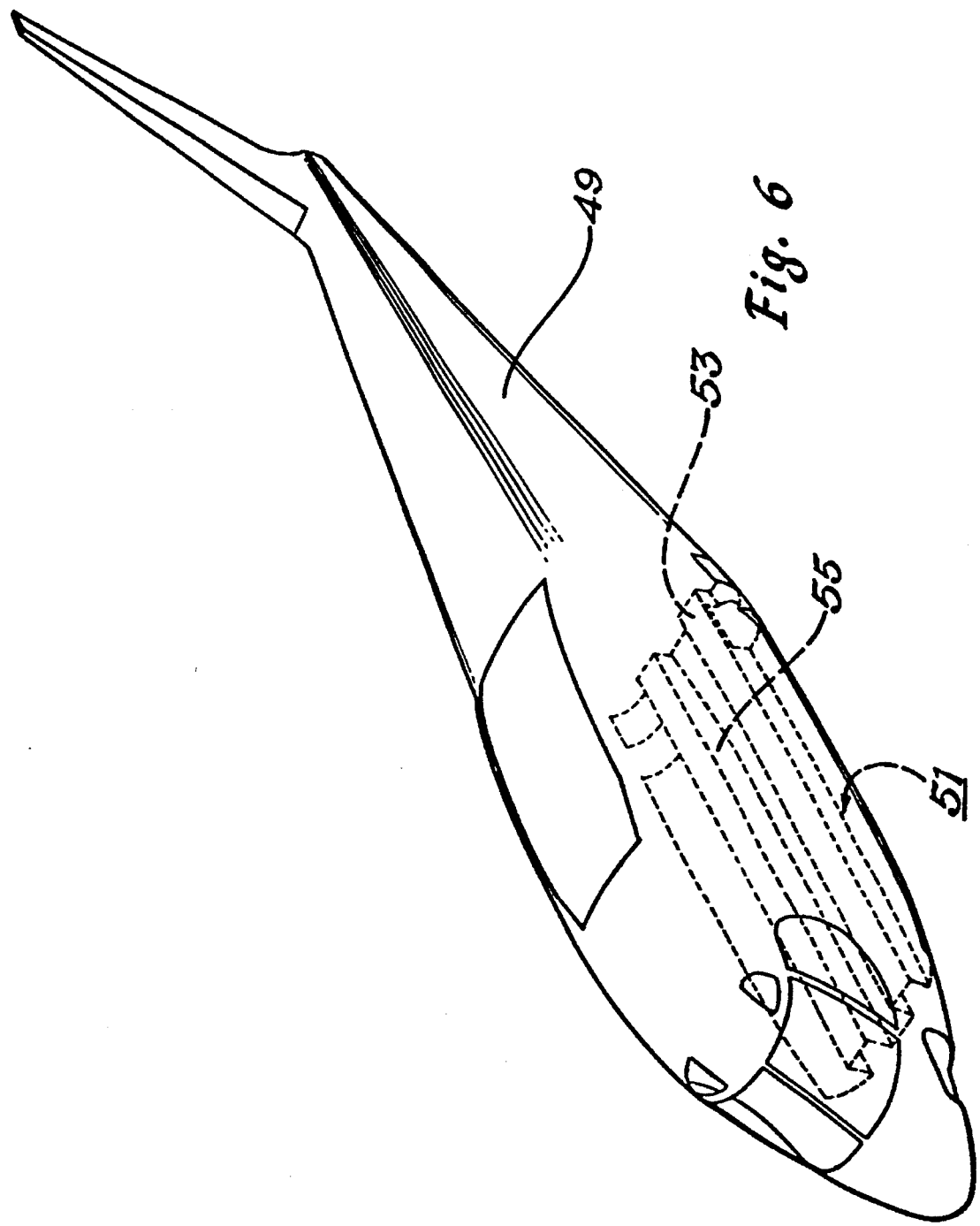
FIG. 6 is a perspective view of an air frame in use in a helicopter fabricated of composite materials.

The pultruded rods described above are illustrated for use in the manufacture of a helicopter air frame 49 shown in FIG. 6. Shown in dotted line in the air frame 49 is a lower fuselage 51 which includes a plurality of keel beams 53, 55 that distribute loads, such as those induced by pay loads, throughout the air frame.

An enlarged view of the lower fuselage 51 is illustrated in FIG. 7, which again shows the keel beams 53, 55 connected with a skin 57 formed of a composite tape or cloth in the prior art manner to overlay and connect the keel beams, 53, 55 into an integral structure capable of withstanding large loads and bending stresses.

Figure 7:
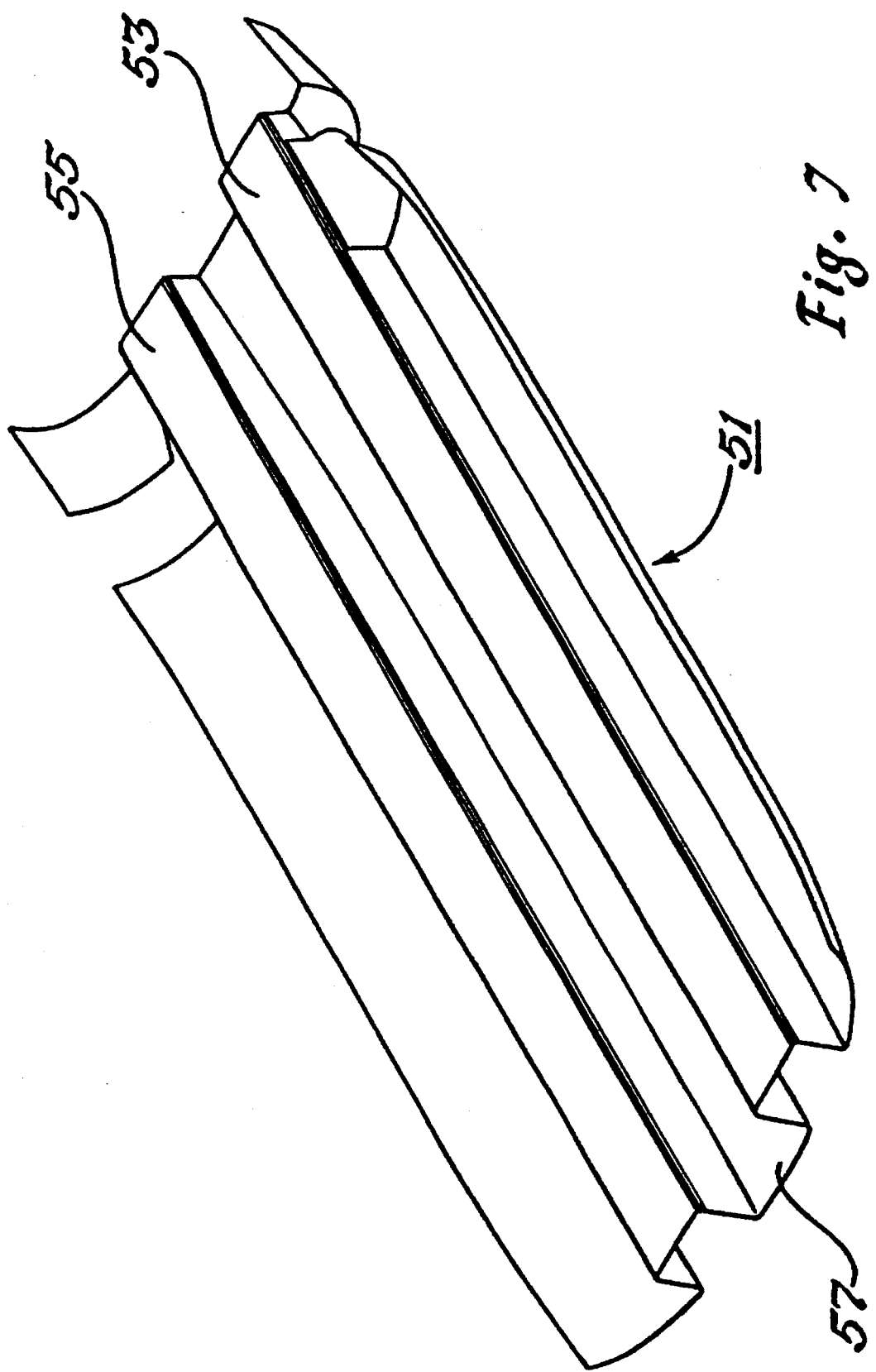
FIG. 7 is a perspective view of the lower fuselage shown in FIG. 4.
Figure 8:
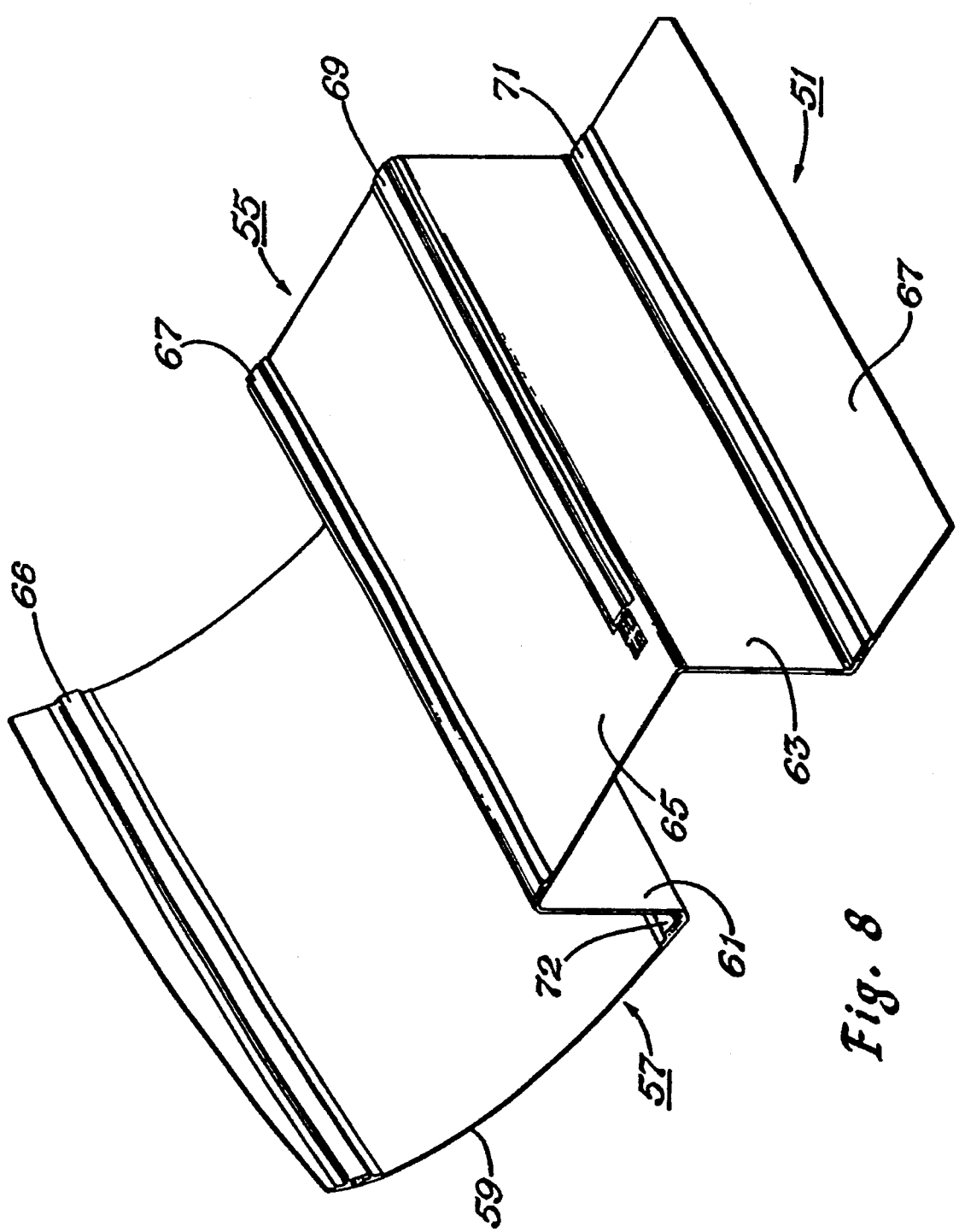
FIG. 8 is an enlarged view of a portion of the lower fuselage shown in FIG. 5.

FIG. 8 is an enlarged perspective view of a portion of the lower fuselage shown in FIG. 7. Here, the keel beam 55 is composed of skin 57 that forms a curved portion 59 and vertical walls 61, 63. Additional horizontal portions 65 & 67 extend from the lower or upper portion of the vertical portion or wall 63 to form the complete lower fuselage panel.

Strengthening the lower fuselage 51, as shown in FIG. 8 are an outside longeron 66, two upper longerons 67, 69 and a lower longeron 71 and 72. As shown in FIG. 9, each of the longerons, such as 69 has two layers of rods 73, 75, the rods of each being bound in a matrix or resin 81. The rods are secured to the structure by two plies of composite tape, 77, 79.

In a typical structure, such as that being described, the webs 63 and 65 react shear loads and are typically cross plied tape or fabric. Bending loads such as described in keel beam 55 must react both shear and axial loads. Axial loads, both tension and compression, are reacted by longerons such as 69. The efficiency of the structure is directly related to the strength and stiffness-to-weight relationships for both the web and the longerons. Fabric or cross plied tape is acceptable for webs but the loss in stiffness and strength in longerons is unacceptable if the full fiber properties in a composite are to be realized. The layer of pultruded rods Of straight graphite fibers provides these properties at the raw material stage and assures maintenance of these properties through fabrication. Rods of fibers less straight than defined by the 0.88 degree standard deviation will still retain their somewhat lower properties through the laminating, compaction and cure process without further degradation. Thus, the use of local layers of rods for discrete axial loads in a laminate is warranted regardless of the degree of straightness.

Although the invention has been described with reference to a specific embodiment, this description is not meant to be construed in a limiting sense. Various modifications of the disclosed embodiment as well as alternative embodiments of the invention will become apparent to persons skilled in the art.

We claim:

1. A method of manufacturing a composite material of graphite fibers and resin matrix to increase compressive strength by minimizing waviness of the graphite fibers, comprising the continuous process steps of:

heating carbon fibers while being pulled to maintain fiber straightness to a temperature to at least partially convert the carbon fibers to graphite fibers;

continuously pulling multiple said graphite fibers through a die with a tension to straighten the graphite fibers and minimize waviness;

impregnating the graphite fibers while under said tension to produce a graphite fiber and resin composite material, the resin constituting at least 10 percent by volume of the composite material;

curing the resin of the composite rod while maintaining fiber tension to form a stiff composite rod of resin matrix containing graphite fibers sufficiently free of waviness such that the compressive strength of the rod approaches the tensile strength.

2. The method defined by claim 1 wherein the resin constitutes about 20 to 50 percent by volume of the composite material.

3. The method defined by claim 2 wherein the fibers are less wavy than an A/L ratio of 0.9 percent determined by measuring the distribution of angularity found in fiber alignment in a selected cross section and wherein the standard deviation for a 300 sample angularity measurement is not greater than 0.88 degrees.

4. The method defined by claims 1, 2 or 3 which further comprises fiber having a cross sectional diameter of not greater than 0.001 inch.

\* \* \* \* \*